(12) United States Patent
Lee et al.

(10) Patent No.: US 10,910,639 B2
(45) Date of Patent: Feb. 2, 2021

(54) MULTI-LAYER NEGATIVE ELECTRODE WITH DIFFERENT BINDER CONTENT AND DIFFERENT PARTICLE SIZE OF ACTIVE MATERIAL IN EACH LAYER AND LITHIUM SECONDARY BATTERY COMPRISING THE SAME

(71) Applicant: LG CHEM, LTD., Seoul (KR)

(72) Inventors: Taek Soo Lee, Daejeon (KR); Chang Wan Koo, Daejeon (KR); Sang Hoon Choi, Daejeon (KR); Jung Min Yang, Cheongju-si (KR); Il Jae Moon, Incheon (KR)

(73) Assignee: LG Chem, Ltd.

( * ) Notice: Subject to any disclaimer, the term of this patent is extended or adjusted under 35 U.S.C. 154(b) by 208 days.

(21) Appl. No.: 16/069,730

(22) PCT Filed: Sep. 27, 2017

(86) PCT No.: PCT/KR2017/010692
§ 371 (c)(1),
(2) Date: Jul. 12, 2018

(87) PCT Pub. No.: WO2018/070703
PCT Pub. Date: Apr. 19, 2018

(65) Prior Publication Data
US 2019/0027740 A1    Jan. 24, 2019

(30) Foreign Application Priority Data
Oct. 12, 2016  (KR) .................. 10-2016-0131922

(51) Int. Cl.
| | | |
|---|---|---|
| *H01M 4/36* | (2006.01) | |
| *H01M 4/04* | (2006.01) | |
| *H01M 4/13* | (2010.01) | |
| *H01M 4/62* | (2006.01) | |
| *H01M 4/139* | (2010.01) | |
| *H01M 10/0525* | (2010.01) | |
| *H01M 4/02* | (2006.01) | |

(52) U.S. Cl.
CPC ............. *H01M 4/366* (2013.01); *H01M 4/04* (2013.01); *H01M 4/0404* (2013.01); *H01M 4/0435* (2013.01); *H01M 4/0471* (2013.01); *H01M 4/13* (2013.01); *H01M 4/139* (2013.01); *H01M 4/36* (2013.01); *H01M 4/62* (2013.01); *H01M 4/621* (2013.01); *H01M 4/623* (2013.01); *H01M 10/0525* (2013.01); *H01M 2004/021* (2013.01); *H01M 2004/027* (2013.01)

(58) Field of Classification Search
CPC ...... H01M 4/366; H01M 4/04; H01M 4/0404; H01M 4/0435; H01M 4/0471; H01M 4/13; H01M 4/139; H01M 4/36; H01M 4/62; H01M 4/621; H01M 4/623; H01M 10/0525

See application file for complete search history.

(56) References Cited

U.S. PATENT DOCUMENTS

| | | | |
|---|---|---|---|
| 2008/0248387 A1 | 10/2008 | Hinoki et al. | |
| 2014/0287316 A1 | 9/2014 | Ahn et al. | |
| 2014/0363736 A1* | 12/2014 | Kim | ...................... H01M 4/505 429/220 |
| 2015/0340732 A1* | 11/2015 | Kim | .................... H01M 10/058 429/94 |
| 2016/0149208 A1* | 5/2016 | Suzuki | ................ H01M 4/0404 429/209 |

FOREIGN PATENT DOCUMENTS

| | | |
|---|---|---|
| EP | 2 811 551 A1 | 12/2014 |
| JP | 2008-258055 A | 10/2008 |
| JP | 5213015 B2 | 6/2013 |
| KR | 10-2013-0116026 A | 10/2013 |
| KR | 10-2013-0116038 A | 10/2013 |
| KR | 10-2014-0095980 A | 8/2014 |
| KR | 10-2014-0137660 A | 12/2014 |
| KR | 10-2015-0029054 A | 3/2015 |
| KR | 10-1527748 B1 | 6/2015 |
| KR | 10-1560471 B1 | 10/2015 |
| KR | 10-2016-0050283 A | 5/2016 |
| KR | 10-2017-0075963 A | 7/2017 |
| KR | 10-2017-0076604 A | 7/2017 |

OTHER PUBLICATIONS

International Search Report (PCT/ISA/210) issued in PCT/KR2017/010692, dated Jan. 16, 2018.

* cited by examiner

*Primary Examiner* — Jimmy Vo
(74) *Attorney, Agent, or Firm* — Lerner, David, Littenberg, Krumholz & Mentlik, LLP

(57) ABSTRACT

A multi-layer negative electrode according to an embodiment of the present disclosure includes: a current collector configured to transmit electrons between an outer lead and a negative electrode active material; a first negative electrode mixture layer formed on one surface or both surfaces of the current collector and including a first negative electrode active material and a first binder; and a second negative electrode mixture layer formed on the first negative electrode mixture layer and including a second negative electrode active material, wherein the first negative electrode mixture layer has an electrode density of about 0.9 to 2.0 g/cc and the second negative electrode mixture layer has an electrode density of about 0.2 to 1.7 g/cc, which is a range lower than that of the electrode density of the first negative electrode mixture layer. The multi-layer negative electrode can be included in a lithium secondary battery.

20 Claims, No Drawings

MULTI-LAYER NEGATIVE ELECTRODE WITH DIFFERENT BINDER CONTENT AND DIFFERENT PARTICLE SIZE OF ACTIVE MATERIAL IN EACH LAYER AND LITHIUM SECONDARY BATTERY COMPRISING THE SAME

TECHNICAL FIELD

The present disclosure relates to a multi-layer negative electrode with a different binder content and a different particle size of an active material in each layer and a lithium secondary battery including the same.

BACKGROUND ART

As the technical development of and the demand for mobile devices has increased, the demand for secondary batteries as energy sources has rapidly increased. Among such secondary batteries, lithium secondary batteries, which have high energy density, high operating voltage, a long cycle lifespan, and a low self-discharge rate, have been commercially available and widely used.

Recently, in line with growing concerns about environmental issues, research into electric vehicles (EVs), hybrid EVs (HEVs), and the like which are able to replace vehicles which use fossil fuels such as gasoline vehicles and diesel vehicles, which are one of major causes of air pollution, has been actively conducted. As a power source for EVs, HEVs, and the like, research on the lithium secondary batteries having high energy density, high discharge voltage, and output stability has been actively conducted, and some lithium secondary batteries have been used.

Accordingly, lithium secondary batteries have been developed to realize high voltage and high capacity in response to consumer demands. In order to realize the high capacity, a process of optimizing a positive electrode material, a negative electrode material, a separator and an electrolytic solution, which are four elements of the lithium secondary batteries within a limited space is required.

Generally, the easiest way to produce the required high capacity is manufacturing a high loaded electrode by disposing a large amount of electrode active material on a current collector. However, disposition of the electrode active material in this location may reduce battery performance and stability since electrode separation may occur during the coating, drying or rolling of the electrode when a certain level of electrode adhesion is not secured.

Therefore, research for a method for improving the electrode adhesion is actively conducted to manufacture a battery having improved performance and stability while realizing the high capacity. Currently, a method of incorporating a binder that improves the electrode adhesion in the electrode is being widely used.

The electrode active material, the conductive material and the current collector constituting the electrode are solid at room temperature and have different surface characteristics and bonding is difficult at room temperature. However, bonding force between the elements of the electrode is increased when a polymeric binder is used. Accordingly, suppression of the phenomenon of electrode separation in the process of coating, drying and rolling the electrode is possible.

However, when the content of the binder is increased to improve the electrode adhesion, internal resistance of the electrode increases, electron conductivity decreases, and the capacity also decreases. In other words, when the content of the binder is small, the electrode is broken in the charging and discharging process as the adhesion is lowered and the cycle characteristics are deteriorated.

Further, in a process of drying a coated electrode, due to a temperature condition which is 'Tg or higher', the binder contained in a slurry state moves in a direction in which a solvent is volatilized (a direction away from the current collector), so that the adhesion between the current collector and the electrode mixture is further weakened.

Therefore, development of an electrode capable of improving overall performance of a battery by securing sufficient adhesion with a small amount of binder while having high theoretical capacity is much needed.

DISCLOSURE

Technical Problem

The present disclosure is provided to solve the above technical problems of the related art.

The inventors of the present disclosure have conducted intensive researches and various experiments and have found that when a binder content and an electrode density of a negative electrode mixture layer in contact with a current collector are increased to a predetermined value or higher, an adhesion at the interface between the current collector and the negative electrode mixture layer is improved, and thus sufficient adhesion between the current collector and the active material can be secured even if the content of the binder is similar to that of the conventional negative electrode and deterioration of the overall battery performance can be also be prevented, thereby completing the present disclosure.

Technical Solution

The present disclosure provides a multi-layer negative electrode including:

a current collector configured to transmit electrons between an outer lead and a negative electrode active material; a first negative electrode mixture layer formed on one surface or both surfaces of the current collector and including a first negative electrode active material and a first binder; and a second negative electrode mixture layer formed on the first negative electrode mixture layer and including a second negative electrode active material, wherein the first negative electrode mixture layer has an electrode density of about 0.9 to 2.0 g/cc and the second negative electrode mixture layer has an electrode density of about 0.2 to 1.7 g/cc, which is a range lower than that of the electrode density of the first negative electrode mixture layer.

In particular, the first negative electrode mixture layer may have an electrode density of about 1.4 to 1.8 g/cc and the second negative electrode mixture layer may have an electrode density of about 0.8 to 1.6 g/cc, which is a range lower than that of the electrode density of the first negative electrode mixture layer.

Particularly, after converting the negative electrode having the negative electrode mixture layer formed thereon into a certain area, a weight and a thickness may be measured to obtain a volume, and the electrode density may be obtained therefrom. More particularly, after forming the first negative electrode mixture layer and the second negative electrode mixture layer, an average density of all the electrodes may be obtained by the same method as described above. Then, the electrode density of the first negative electrode mixture layer when the second negative electrode mixture layer is removed may be obtained, and the electrode density of only the second negative electrode mixture layer may be obtained therefrom.

When the electrode density of the first negative electrode mixture layer is too low beyond the above range, a sufficient adhesion may not be obtained as desired, and when the electrode density of the second negative electrode mixture layer is too low, there may be a decrease in the capacity per volume due to a decrease in electrode density of the second negative electrode mixture layer. Also, when the electrode densities of the first negative electrode mixture layer and the second negative electrode mixture layer are excessively exceed the above ranges, a particle strength may become too low and tortuosity and pores of the electrode may become smaller so that impregnability of the electrolytic solution may deteriorate and movement of lithium ions may become difficult, and thus an output characteristic may deteriorate.

Further, an average electrode density of the multi-layer negative electrode according to the present disclosure may be more than 1.0 g/cc, particularly 1.2 g/cc or more, and more particularly 1.4 to 1.6 g/cc.

When the average electrode density is out of the above range and 1.0 g/cc or less, an adhesion, a capacity maintenance rate and an output characteristic may be all lowered.

Meanwhile, the second negative electrode mixture layer may not include a binder as an essential component. Therefore, the second negative electrode mixture layer may or may not include a binder, unlike the first negative electrode mixture layer.

When the second negative electrode mixture layer includes a second binder, a weight ratio of the first binder and the second binder (the first binder/the second binder) may be about 1.2 to 10, particularly 3 to 8, and more particularly 5 to 7.

When a content of the binder included in the entire negative electrode is constant, and the weight ratio of the first binder is less than 1.2, an amount of the binder included in the first negative electrode mixture layer may be too small, and thus a sufficient adhesion between the current collector and the interface of the first negative electrode mixture layer may not be secured.

That is, as described above, in order to exhibit an electrode adhesion as desired, the electrode density of the first negative electrode mixture layer contacting the current collector must satisfy the above range with a range higher than that of the electrode density of the second negative electrode mixture layer, and the binder content of the first negative electrode mixture layer must be greater than the binder content of the second negative electrode mixture layer located far from the current collector. This is because the inventors of the present disclosure have found that the electrode density of the negative electrode mixture layer in addition to the binder content has the greatest influence on the adhesion of the negative electrode, and the best adhesion may be exhibited when the configurations have the above range.

Therefore, the adhesion at the interface between the current collector and the mixture layer has the greatest influence on the adhesion of the negative electrode, but the adhesion between the two is the lowest. So, when the adhesion of this part is sufficiently increased, the adhesion may be significantly improved even with a small binder content, thereby minimizing a decrease in capacity due to cycling.

Meanwhile, when the weight ratio of the binder of each layer satisfies the above range, the binder content is not limited, but a total binder content may be about 0.5 to 30 wt % based on the weight of the entire negative electrode mixture layer, particularly 0.5 to 10 wt %, and more particularly 2 to 5 wt %.

More particularly, within a range satisfying the above range, the first binder content may be 1 to 10 wt % based on the weight of the entire first negative electrode mixture layer, particularly 2 to 5 wt %, and the second binder content may be 0.1 to 5 wt % based on the weight of the entire second negative electrode mixture layer, particularly 0.1 to 2 wt %.

When the first binder content and the second binder content take too much wt % in each of the negative electrode mixture layers, a content of the active material may be relatively decreased and thus the capacity may be decreased. And when the binder contents take too little wt %, sufficient adhesion may not be exhibited.

The kinds of the first binder and the second binder are not limited, and may be the same kind of material or different kinds of materials, and may be selected from the group consisting of polyvinylidene fluoride (PVdF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber (SBR), and fluorine rubber.

In one specific example, the first negative electrode mixture layer and the second negative electrode mixture layer of the negative electrode prepared in a multi-layer structure may not be mixed with each other and may form an interface, and solids of each layer may be intermixed therebetween and may not form an interface.

This is determined depending on how the electrode of the multi-layer structure is prepared. For example, when a second electrode slurry is applied to form the second electrode mixture layer after applying and drying a first electrode slurry to form the first electrode mixture layer, the first electrode mixture layer and the second electrode mixture layer may not be mixed with each other and may form an interface, and when the second electrode slurry is applied before applying and drying the first electrode slurry, solids may be intermixed therebetween and thus the interface may not be formed.

Therefore, for forming the electrode, a configuration of the electrode can be suitably selected in consideration of the advantages and disadvantages of each structure. For example, when the interface is formed, a phenomenon in which the binder rises to the second electrode mixture layer may be reduced, and thus the adhesion may be secured, but, an interfacial resistance may be generated between the first electrode mixture layer and the second electrode mixture layer. When the interface is not formed, although the interfacial resistance problem may not occur, the phenomenon in which the binder included in the first electrode mixture layer rises to the second electrode mixture layer may occur.

The first negative electrode mixture layer and the second negative electrode mixture layer may have a thickness ratio of 1:9 to 7:3, particularly 3:7 to 5:5 based on the interface when there is an interface, or based on a thickness at coating before intermixing.

When the thickness of the first negative electrode mixture layer is too small beyond the range, sufficient adhesion between the current collector and the negative electrode mixture layer may be not secured with the binder content contained in the first negative electrode mixture layer, and when the thickness is too large, the content of the active material is reduced and the capacity is reduced as a whole.

Therefore, satisfying the above is most preferable for securing the capacity and sufficient adhesion of the electrode.

Meanwhile, in order for the electrode density, which is one of the conditions for exhibiting the effect of the present disclosure, to satisfy the above range, a particle diameter and a shape of the active material have the greatest influence on the electrode density, so that the particle diameter and the shape of the active material may be configured to satisfy the above range.

In particular, the first negative electrode active material may be in a form of an elliptical particle whose major axis is parallel to the surface of the current collector as a vertical cross section, and the second negative electrode active material may be in a form of a spherical particle, or the first negative electrode active material and the second negative electrode active material may each be in forms of elliptical particles whose major axes are parallel to the surface of the current collector as a vertical cross section, and the particle major axis of the first negative electrode active material may be relatively larger than the particle major axis of the second negative electrode active material.

The electrode density decreases the more the negative electrode active material has a spherical particle form, and the electrode density increases the more the negative electrode active material has an elliptical particle form, so it is more preferable that the first negative electrode active material has at least an elliptical particle form.

In addition, as another component, an average particle diameter (D50) of the first negative electrode active material may be about 10 to 30 µm, and an average particle diameter (D50) of the second negative electrode active material may be about 5 to 25 µm.

In particular, the average particle diameter (D50) (50% diameter of soil particle) means a particle diameter with a percentage of passing masses of 50% at a grain size accumulation curve, and as an example, the D50 value may be measured by obtaining a volume-based distribution diagram of particulate material using Microtrac (S-3500).

When the average particle diameter of the first negative electrode active material satisfies the above conditions, the electrode density of the first electrode mixture layer may be about 0.9 to 2.0 g/cc, which facilitates rolling, and consequently, sufficient adhesion may be exhibited. Also, when the particle diameter condition is not satisfied even though the electrode density condition is satisfied, a strong rolling process may be required, and such an excessive rolling process may cause a large movement of particles during the rolling process, resulting in a disconnection between the particles. As a result, the binder between the particles formed before rolling may be broken. Thus, it is difficult to have satisfactory adhesion even if the electrode density is high, and a larger amount of binder is required for the satisfactory adhesion, so it is not preferable for a high capacity and high adhesion electrode.

When the average particle diameter of the second negative electrode active material satisfies the above conditions, a passage through which the electrolytic solution can be impregnated and lithium ions can enter and exit may be sufficiently secured, and thus the second electrode mixture layer may have a high energy density per volume and the output may be not lowered.

The first negative electrode active material and the second negative electrode active material are not limited, but may be the same kind of compound or different kinds of compound.

Examples of the negative electrode active material which may be used include one or more carbon-based materials selected from the group consisting of crystalline artificial graphite, crystalline natural graphite, amorphous hard carbon, low crystalline soft carbon, carbon black, acetylene black, ketjen black, super P, praphene, and fibrous carbon, Si-based material, a metal composite oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide such as SiO, $SiO_2$, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; a Li—Co—Ni based material; titanium oxide; lithium titanium oxide, etc., but the present disclosure is not limited thereto.

Meanwhile, in order to improve the electrical conductivity, the first negative electrode mixture layer and the second negative electrode mixture layer according to the present disclosure may each further include an electrically conductive material. In particular, a content of the conductive material included in each of the negative electrode mixture layers may be about 1 to 10 wt % based on the total weight of the solid of each of the electrode mixture layers.

When the content of the conductive material is less than 1 wt %, the desired electrical conductivity may not be obtained, and when content of the conductive material is more than 10 wt %, the content of the active material etc. may be relatively decreased and thus the capacity may be decreased.

The conductive material is not particularly restricted so long as the conductive material exhibits high conductivity while the conductive material does not induce any chemical change in a battery to which the conductive material is applied. For example, graphite such as natural graphite or artificial graphite; carbon black such as carbon black, acetylene black, Ketjen black, channel black, furnace black, lamp black, thermal black; conductive fiber, such as carbon fiber or metallic fiber; metallic powder such as carbon fluoride powder, aluminum powder, or nickel powder; a conductive whisker such as zinc oxide or potassium titanate; a conductive metal oxide, such as titanium oxide; or polyphenylene derivatives may be used as the conductive material.

In particular, like the binder, the conductive material included in each of the negative electrode mixture layers may be the same kind or different kinds.

In addition, the first negative electrode mixture layer and the second negative electrode mixture layer may further include a filler by case.

The filler is an optional component used to inhibit expansion of the electrode. There is no particular limit to the filler so long as the filler does not cause chemical changes in a battery to which the filler is applied, and is made of a fibrous material. Examples of the filler which may be used include olefin polymers such as polyethylene and polypropylene; and fibrous materials, such as glass fiber and carbon fiber.

The fillers included in the negative electrode mixture layers also may be the same kind or different kinds.

The current collector may be a negative electrode current collector, and may be generally manufactured to have a thickness of about 3 to 500 µm. For the negative electrode current collector, a material not inducing chemical change and having conductivity may be used without limitation. For example, copper, stainless steel, aluminum, nickel, titanium, calcined carbon, a surface treated material of copper or stainless steel with carbon, nickel, titanium, silver, an aluminum-cadmium alloy, etc. may be used. Also, to increase the adhesiveness of the negative electrode active material, minute embossing may be formed on the surface of the negative electrode current collector. The negative electrode current collector may have various forms such as that of a film, a sheet, a foil, a net, a porous body, a foamed body, a non-woven fabric, etc.

Meanwhile, the present disclosure also provides a method of preparing the multi-layer negative electrode according to the present disclosure.

The method of preparing the multi-layer negative electrode includes: (i) a process of coating a first negative electrode slurry including a first negative electrode active material and a first binder on one surface or both surfaces of a negative electrode current collector and forming a first coating layer; and (ii) a process of coating a second negative electrode slurry including a second negative electrode active material on the first coating layer and forming a second coating layer, wherein an electrode density of the first coating layer is about 0.9 to 2.3 g/cc, and an electrode density of the second coating layer is about 0.2 to 1.7 g/cc, which is a range lower than that of the electrode density of the first coating layer.

In particular, as described above, in the multi-layer negative electrode according to the present disclosure, the binder content and the electrode density of each negative electrode mixture layers must satisfy the conditions according to the present disclosure. The binder content may be adjusted in a case of preparing a slurry for forming a mixture layer. The electrode density may not be simply controlled but may be varied depending on a particle size and a shape of the active electrode. Therefore, the preparing method may vary depending on how the electrode density is adjusted to be within a range satisfying the conditions according to the present disclosure.

Therefore, as described above, as one factor, an average particle diameter (D50) of the first negative electrode active material may be about 10 to 30 μm, and an average particle diameter (D50) of the second negative electrode active material may be about 5 to 25 μm.

Meanwhile, as another factor, a particle shape may vary depending on a degree of orientation of the particle itself, but may also be influenced by a rolling strength.

In this context, the method of preparing the multi-layer negative electrode according to the present disclosure may further include:

a process of drying the first coating layer between processes (i) and (ii), and a process of drying the second coating layer after process (ii) and rolling the coating layers;

a process of drying and rolling the first coating layer between processes (i) and (ii), and a process of drying and rolling the second coating layer after process (ii); or a process of drying and rolling the both coating layers at once after process (ii).

In particular, according to each method, conditions such as the average particle diameter of the active material, the degree of orientation, the binder content, the rolling strength and time in the process etc. may be appropriately adjusted to satisfy the range of the rolling density. As a method of controlling the rolling strength, it is possible to use a static pressure method (a method of changing an absolute value of rolling strength) or a stationary method (a method of controlling a gap of a roller in a rolling process), but the present disclosure is not limited thereto.

Meanwhile, when the binder content, which affects the adhesion is as described above and the second negative electrode slurry does not include the binder, or the second negative electrode slurry can further include the second binder. When the second negative electrode slurry includes the second binder, a weight ratio of the first binder and the second binder (the first binder/the second binder) may be about 1.2 to 10.

The present disclosure also provides a lithium secondary battery including the multi-layer negative electrode.

The lithium secondary battery may have a structure in which a lithium salt-containing non-aqueous electrolyte is impregnated in an electrode assembly including the multi-layer negative electrode, positive electrode and a separator.

The positive electrode may include a positive electrode active material and a binder in a positive electrode current collector, and like the negative electrode, may further include a conductive material and a filler selectively.

The positive electrode current collector may be generally manufactured to have a thickness of about 3 to 500 μm. For the positive electrode current collector, a material having a high conductivity and not inducing the chemical change may be used without limitation. For example, stainless steel, aluminum, nickel, titanium, calcined carbon, a surface treated material of aluminum or stainless steel with carbon, nickel, titanium, silver, or the like may be typically used. To increase the adhesiveness of the positive electrode active material, minute embossing may be formed on the surface of the positive electrode current collector. In addition, the positive electrode current collector may have various forms such as that of a film, a sheet, a foil, a net, a porous body, a foamed body, a non-woven fabric, etc.

Examples of the positive electrode active material may include, for example, a layered compound of lithium cobalt oxide ($LiCoO_2$), lithium nickel oxide ($LiNiO_2$), etc. or a substituted compound with one or more transition metals; a lithium manganese oxide such as $Li_1+xMn_2-xO_4$ (in which x is 0 to 0.33), $LiMnO_3$, $LiMn_2O_3$, $LiMnO_2$, etc.; lithium copper oxide ($Li_2CuO_2$); a vanadium oxide such as $LiV_3O_8$, $LiFe_3O_4$, $V_2O_5$, $Cu_2V_2O_7$, etc.; a Ni site-type lithium nickel oxide represented by Chemical Formula of $LiNi_1-xMxO_2$ (in which M=Co, Mn, Al, Cu, Fe, Mg, B or Ga, x=0.01 to 0.3); a lithium manganese complex oxide represented by Chemical Formula $LiMn_2-xMxO_2$ (in which M=Co, Ni, Fe, Cr, Zn or Ta, and x=0.01 to 0.1) or $Li_2Mn_3MO_8$ (in which, M=Fe, Co, Ni, Cu or Zn); a spinel-structured lithium manganese composite oxide represented by $LiNixMn_2-xO_4$; $LiMn_2O_4$ in which a portion of Li is substituted with alkaline earth metal ions; a disulfide compound; $Fe_e(MoO_4)_3$, and the like. However, the present disclosure may not be limited thereto.

As the separator, an insulating thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer such as polypropylene, which exhibits chemical resistance and hydrophobicity, glass fiber, or polyethylene is used. In a case in which a solid electrolyte such as polymer is used as an electrolyte, the solid electrolyte may function as the separator.

The non-aqueous electrolyte containing a lithium salt may be composed of a non-aqueous electrolytic solution and a lithium salt. A non-aqueous organic solvent, an organic solid electrolyte or an inorganic solid electrolyte may be used as the non-aqueous electrolytic solution, but it is not limited thereto.

Examples of the non-aqueous organic solvent may include non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3- dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte may include nitrides, halides, and sulphates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

A lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte containing the lithium salt. According to circumstances, in order to impart incombustibility, the non-aqueous electrolyte may further include halogen-containing solvents, such as carbon tetrachloride and ethylene trifluoride. Furthermore, in order to improve high-temperature storage characteristics, the non-aqueous electrolytic solution may further include carbon dioxide gas, and may further include fluoro-ethylene carbonate (FEC), propene sultone (PRS), etc.

In one specific example, a lithium salt such as $LiPF_6$, $LiClO_4$, $LiBF_4$, $LiN(SO_2CF_3)_2$ etc. may be added to a mixed solvent of a cyclic carbonate of EC or PC, which is a high-dielectric solvent and a linear carbonate of DEC, DMC or EMC, which is a low viscosity solvent to prepare an electrolytic solution.

The present disclosure provides a battery module or a battery pack including the secondary battery as a unit battery, and a device including the same as a power source.

Specific examples of the device include an electric vehicle including an electric vehicle (EV), a hybrid electric vehicle (HEV), a plug-in hybrid electric vehicle (PHEV) and a power storage system, and the like, but the present invention is not limited thereto.

A structure of the battery pack, a method of manufacturing the same, a structure of the device, and a method of manufacturing the same are well known in the art, so a detailed description thereof will be omitted herein.

Advantageous Effects

As described above, in the multi-layer negative electrode according to the present disclosure, the negative electrode mixture layer in contact with the current collector has a relatively high binder content and electrode density, thereby improving the adhesion at the interface of the current collector and the negative electrode mixture layer and securing the adhesion between the current collector and the active material, even if the content of the binder is similar to that of a conventional negative electrode. Therefore, overall battery performance such as a cycle characteristic and safety may be improved.

DETAILED DESCRIPTION OF THE PREFERRED EMBODIMENTS

Hereinafter, embodiments of the present disclosure will be described with reference to the accompanying drawings. However, the description provided herein is for better understanding of the present disclosure, and the scope of the present disclosure is not limited thereto.

Example 1

1-1. Preparation of a First Negative Electrode Slurry

Using SBR as a binder and earthy natural graphite having an average particle diameter (D50) of 16 μm as a negative electrode active material, negative electrode active material: carbon black (conductive material):CMC (thickener):binder were mixed with distilled water in a ratio of 93.5:1.5:2.0:3.0 to prepare a negative electrode slurry for preparing a first negative electrode mixture layer.

1-2. Preparation of a Second Negative Electrode Slurry

Using SBR as a binder and earthy natural graphite having an average particle diameter (D50) of 11 μm as a negative electrode active material, negative electrode active material: carbon black (conductive material):CMC (thickener):binder were mixed with distilled water in a ratio of 93.5:1.5:2.0:1.0 to prepare a negative electrode slurry for preparing a second negative electrode mixture layer.

1-3. Preparation of a Negative Electrode

The first negative electrode slurry was applied to a current collector of a copper foil so as to have a loading amount of 8 mg/cm² (weight after drying), followed by drying and rolling so as to have an electrode density of 1.1 g/cc to form the first negative electrode mixture layer, and the second negative electrode slurry was applied to the first negative electrode mixture layer so as to have a loading amount of 8 mg/cm² (weight after drying), followed by drying and rolling so as to have an average electrode density of the final first negative electrode mixture layer and the second negative electrode mixture layer be 1.43 g/cc to form a negative electrode. In particular, the electrode density of the first negative electrode mixture layer after a removal of the second negative electrode mixture layer was about 1.55 g/cc, and from that, it can be seen that the electrode density of the second negative electrode mixture layer corresponds to 1.3 g/cc.

Example 2

A negative electrode was prepared in the same manner as in Example 1 except that the first negative electrode active material and the second negative electrode active material having an average particle diameter of 11 μm were used. In particular, an average electrode density of the first negative electrode mixture layer and the second negative electrode mixture layer was about 1.35 g/cc, the electrode density of the first negative electrode mixture layer was about 1.4 g/cc, and the electrode density of the second negative electrode mixture layer was about 1.3 g/cc.

Example 3

A negative electrode was prepared in the same manner as in Example 1 except that the rolling process was controlled so that the electrode density of the first negative electrode mixture layer was 1.3 g/cc, and the electrode density of the second negative electrode mixture layer was 1.2 g/cc to obtain an average electrode density of 1.25 g/cc.

Example 4

A negative electrode was prepared in the same manner as in Example 1 except that the ratio of negative electrode active material:carbon black (conductive material):CMC (thickener):binder included in the first negative electrode slurry was 93:1.5:2.0:3.5, and the ratio of positive electrode active material:carbon black (conductive material):CMC (thickener):binder included in the second negative electrode slurry was 96:1.5:2.0:0.5. In particular, as in Example 1, the electrode density of the first negative electrode mixture layer was about 1.55 g/cc, and the electrode density of the second negative electrode mixture layer was about 1.3 g/cc.

Example 5

A first negative electrode slurry and a second negative electrode slurry were prepared in the same manner as in Example 1 except that the ratio of negative electrode active material:carbon black (conductive material):CMC (thickener):binder included in the first negative electrode slurry was 92.5:1.5:2.0:4.0, and the ratio of positive electrode active material:carbon black (conductive material):CMC (thickener):binder included in the second negative electrode slurry was 96.5:1.5:2.0:0. The first negative electrode slurry was applied to a current collector of a copper foil at a loading amount of 8 mg/cm$^2$, and before drying, the second negative electrode slurry was applied to the first positive electrode mixture layer at a loading amount of 8 mg/cm$^2$, and these were rolled together to prepare a negative electrode in which an electrode density of the final first negative electrode mixture layer was 1.55 g/cc and an electrode density of the second negative electrode mixture layer was 1.4 g/cc.

Comparative Example 1

A negative electrode was prepared in the same manner in Example 1 except that the electrode density of the first negative electrode mixture layer and the electrode density of the second negative electrode mixture layer were 1.0 g/cc.

Comparative Example 2

A negative electrode was prepared in the same manner in Example 1 except that the electrode density of the first negative electrode mixture layer was 1.2 g/cc and the electrode density of the second negative electrode mixture layer was 1.3 g/cc.

Comparative Example 3

A negative electrode was prepared in the same manner as in Example 1 except that the ratio of negative electrode active material:carbon black (conductive material):CMC (thickener):binder included in the first negative electrode slurry was 94.5:1.5:2.0:2.0, and the ratio of positive electrode active material:carbon black (conductive material): CMC (thickener):binder included in the second negative electrode slurry was 94.5:1.5:2.0:2.0.

Comparative Example 4

In Comparative Example 3, a negative electrode was prepared in the same manner as in Example 1 except that the first negative electrode slurry was applied at a loading amount of 16 mg/cm$^2$, dried and rolled to have an electrode density of 1.43 g/cc.

Comparative Example 5

A negative electrode was prepared in the same manner as in Example 1 except that the second negative electrode slurry was applied at a loading amount of 16 mg/cm$^2$, dried and rolled to have an electrode density of 1.43 g/cc.

Experimental Example 1

Each of the negative electrode plates prepared in Examples 1 to 5 and Comparative Examples 1 to 5 was cut to a width of 15 mm and fixed on a slide glass. The current collector was peeled off at a speed of 300 mm/min and a 180 degree peel strength was measured. The results are shown in Table 1.

TABLE 1

|  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|
| Adhesion (gf/15 mm) | 33 | 31 | 28 | 37 | 37 | 11 | 18 | 19 | 14 | 9 |

Referring to Example 1 and Comparative Examples 1 and 2, when the electrode density of the second negative electrode mixture layer is greater than or equal to that of the first negative electrode mixture layer, the adhesion is very low, unlike in the case of the present disclosure. From this, it can be seen that the adhesion between the current collector and the negative electrode mixture layer is affected by the electrode density as well as the binder content, and it is confirmed that the best effect is obtained under the conditions of the present disclosure.

Referring to Examples 1, 4 and 5 and Comparative Example 3, it can be seen that the higher the binder content of the first negative electrode mixture layer, the higher the adhesion when the total binder content is same. This is because the adhesion at the interface between the current collector and the mixture layer is the lowest adhesion among the negative electrode, and the adhesion is significantly improved when the adhesion at the interface is increased. In the case of Example 5, the adhesion is comparable to that of Example 4, in which the content of the first negative electrode mixture layer is slightly lower. This is because in Example 5, the first negative electrode slurry is applied and the second negative electrode slurry is applied before drying, so the first negative electrode mixture layer and the second negative electrode mixture layer are mixed without forming an interface, and the binder of the first negative electrode slurry migrates into the second negative electrode mixture layer slightly during the drying process.

Further, referring to Example 1 and Comparative Examples 4 and 5, the present disclosure exhibits a higher adhesion than Comparative Example 4 which has the same total binder content and a single layer, and exhibits a much higher adhesion than Comparative Example 5 which has a smaller binder content and a single layer.

Meanwhile, referring to Examples 1 to 3, it can be seen that the higher the electrode density of the first negative electrode mixture layer and the higher the total average electrode density, the higher the adhesion.

Taking this into consideration, when the electrode density is increased while the first negative electrode mixture layer in contact with the current collector contains a larger portion of the total binder content, it can be confirmed that the adhesion is higher than that in the case in which no one condition is satisfied.

Experimental Example 2

$Li(Ni_{1/3}Co_{1/3}Mn_{1/3})O_2$ as a positive electrode active material, carbon black and PVDF were mixed with distilled water in a ratio of 96:2:2 to prepare a positive electrode slurry. The slurry was applied to a current collector of an aluminum foil so as to have a loading amount of 730 mg/25 $cm^2$ (weight after drying), followed by drying and rolling so as to have an electrode density of 3.4 g/cc to form a positive electrode.

The positive electrode was cut into a size of 3×4 cm, each negative electrode prepared in Examples 1 to 5 and Comparative Examples 1 to 5 was cut into a size of 3.2×4.2 cm, and then a PE separator was interposed therebetween. Using an electrolytic solution containing 1M of $LiPF_6$ in a solvent in which EC:DMC:DEC=1:2:1, pouch cells were prepared by sealing to an aluminum pouch.

The cells were charged and discharged (3.0V) for 50 cycles in a 1 C CC/CV mode at a ambient temperature of 25° C. and an upper limit voltage of 4.25V, and a capacity maintenance rate were measured. The results are shown in Table 2.

TABLE 2

|  | Capacity maintenance rate (%) | Initial discharge capacity (mAh) |
|---|---|---|
| Example 1 | 97.3 | 74.06 |
| Example 2 | 97.0 | 74.10 |
| Example 3 | 95.3 | 74.10 |
| Example 4 | 98.6 | 74.33 |
| Example 5 | 98.8 | 74.60 |
| Comparative Example 1 | 86.3 | 73.64 |
| Comparative Example 2 | 93.3 | 73.41 |
| Comparative Example 3 | 93.9 | 73.38 |
| Comparative Example 4 | 89.8 | 72.94 |
| Comparative Example 5 | 78.2 | 74.31 |

Referring to Table 2, it can be seen that a life characteristic was improved as the adhesion increased. Further, in Example 4 in which the binder content in the second negative electrode mixture layer was increased, the initial capacity was slightly decreased.

It should be understood by those skilled in the art that various changes may be made without departing from the spirit and scope of the present disclosure.

The invention claimed is:

1. A multi-layer negative electrode comprising:
   a current collector configured to transmit electrons between an outer lead and a negative electrode active material;
   a first negative electrode mixture layer formed on one surface or both surfaces of the current collector and including a first negative electrode active material and a first binder; and
   a second negative electrode mixture layer formed on the first negative electrode mixture layer and including a second negative electrode active material,
   wherein the first negative electrode mixture layer has an electrode density of about 0.9 to 2.0 g/cc and the second negative electrode mixture layer has an electrode density of about 0.2 to 1.7 g/cc, and the electrode density of the second negative electrode mixture layer is lower than the electrode density of the first negative electrode mixture layer.

2. The multi-layer negative electrode of claim 1, wherein an average electrode density of the multi-layer negative electrode is more than 1.0 g/cc and is 1.6 g/cc or less.

3. The multi-layer negative electrode of claim 1, wherein the second negative electrode mixture layer further includes a second binder, and a weight ratio of the first binder and the second binder (the first binder/the second binder) is about 1.2 to 10.

4. The multi-layer negative electrode of claim 3, wherein the second negative electrode mixture layer further includes a second binder, and a weight ratio of the first binder and the second binder (the first binder/the second binder) is about 3 to 8.

5. The multi-layer negative electrode of claim 1, wherein the first binder has a content of about 1 to 10 wt % based on the weight of the entire first negative electrode mixture layer.

6. The multi-layer negative electrode of claim 3, wherein the second binder has a content of about 0.1 to 5 wt % based on the weight of the entire second negative electrode mixture layer.

7. The multi-layer negative electrode of claim 3, wherein the first binder and the second binder are the same or different kinds of materials.

8. The multi-layer negative electrode of claim 1, wherein the first negative electrode mixture layer and the second negative electrode mixture layer are not mixed with each other and form an interface.

9. The multi-layer negative electrode of claim 1, wherein solids of each layers are intermixed between the first negative electrode mixture layer and the second negative electrode mixture layer and an interface is not formed.

10. The multi-layer negative electrode of claim 1, wherein the first negative electrode mixture layer and the second negative electrode mixture layer have a thickness ratio of 1:9 to 7:3.

11. The multi-layer negative electrode of claim 1, wherein the first negative electrode active material is in a form of an elliptical particle whose major axis is parallel to the surface of the current collector as a vertical cross section, and the second negative electrode active material is in a form of a spherical particle.

12. The multi-layer negative electrode of claim 1, wherein the first negative electrode active material and the second negative electrode active material are in forms of elliptical particles whose major axes are parallel to the surface of the current collector as a vertical cross section, and the particle major axis of the first negative electrode active material is relatively larger than the particle major axis of the second negative electrode active material.

13. The multi-layer negative electrode of claim 1, wherein the first negative electrode active material and the second negative electrode active material are the same or different kinds of compounds.

14. The multi-layer negative electrode of claim 1, wherein the first negative electrode active material has an average particle diameter (D50) of about 10 to 30 μm, and the second negative electrode active material has an average particle diameter (D50) of about 5 to 25 μm.

15. The multi-layer negative electrode of claim 1, wherein each of the first binder and the second binder is selected from the group consisting of polyvinylidene fluoride (PVdF), polyvinyl alcohol, carboxymethylcellulose (CMC), starch; hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber (SBR), and fluorine rubber.

16. The multi-layer negative electrode of claim 1, wherein the first negative electrode mixture layer and the second negative electrode mixture layer further include a conductive material.

17. A method of preparing the multi-layer negative electrode of claim 1, comprising:

(i) a process of coating a first negative electrode slurry including a first negative electrode active material and a first binder on one surface or both surfaces of a negative electrode current collector and forming a first coating layer; and (ii) a process of coating a second negative electrode slurry including a second negative electrode active material on the first coating layer and forming a second coating layer, wherein an electrode density of the first coating layer is about 0.9 to 2.0 g/cc, and an electrode density of the second coating layer is about 0.2 to 1.7 g/cc, which is a range lower than that of the electrode density of the first coating layer.

18. The method of claim 17, further comprising:

a process of drying the first coating layer between processes (i) and (ii), and a process of drying the second coating layer after process (ii) and rolling the coating layers;

a process of drying and rolling the first coating layer between processes (i) and (ii, and a process of drying and rolling the second coating layer after process (ii); or a process of drying and rolling both coating layers at once after process (ii).

19. The method of claim 18, wherein when a process of drying and rolling the first coating layer between processes (i) and (ii), and a process of drying and rolling the second coating layer after process (ii) are further comprised, a rolling strength of the first coating layer is higher than that of the second coating layer.

20. The method of claim 17, wherein the second negative electrode slurry further includes a second binder, and a weight ratio of the first binder and the second binder (the first binder/the second binder) is about 1.2 to 10.

* * * * *